US007685564B2

(12) United States Patent
Renner

(10) Patent No.: US 7,685,564 B2
(45) Date of Patent: Mar. 23, 2010

(54) SYSTEM AND METHOD OF PRODUCING COMPUTER PROGRAMMING

(76) Inventor: Peter Renner, Heiligenstock 2, D-51515 Kürten (DE)

( * ) Notice: Subject to any disclaimer, the term of this patent is extended or adjusted under 35 U.S.C. 154(b) by 1249 days.

(21) Appl. No.: 11/158,268

(22) Filed: Jun. 21, 2005

(65) Prior Publication Data
US 2005/0289506 A1 Dec. 29, 2005

(30) Foreign Application Priority Data
Jun. 23, 2004 (EP) ................... 04014708

(51) Int. Cl.
G06F 9/44 (2006.01)
G06F 3/048 (2006.01)
(52) U.S. Cl. ................. 717/109; 717/113; 715/771
(58) Field of Classification Search ......... 717/109, 717/110, 113; 715/771
See application file for complete search history.

(56) References Cited
U.S. PATENT DOCUMENTS

| | | | | |
|---|---|---|---|---|
| 6,425,121 B1 * | 7/2002 | Phillips | ............... | 717/109 |
| 6,546,397 B1 * | 4/2003 | Rempell | ............... | 707/102 |
| 6,701,513 B1 * | 3/2004 | Bailey | ............... | 717/109 |
| 6,807,548 B1 * | 10/2004 | Kemper | ............... | 707/103 R |
| 7,123,970 B1 * | 10/2006 | Stroomer | ............... | 700/17 |
| 7,340,721 B1 * | 3/2008 | Bailey | ............... | 717/109 |
| 2002/0083414 A1 * | 6/2002 | Cheng et al. | ............... | 717/110 |
| 2004/0019875 A1 * | 1/2004 | Welch | ............... | 717/109 |

FOREIGN PATENT DOCUMENTS
EP 0 893 757 A2 1/1999

OTHER PUBLICATIONS

Implementing and Testing new Programming Constructs in a Data Flow VL Ghittori et al. 1998, online Pavia—Italy.
The Khoros Software Development Environment for Image and Signal Processing Konstantinides et al. May 1, 1994, IEEE Inc., New York—US.
Graphical Development Tools for Network—Based Concurrent Supercomputing Beguelin et al. Nov. 18, 1991, IEEE, Inc., New York—US.
Labview: Laboratory Virtual Instrument Engineering Workbench Sep. 1986, Byte, McGraw-Hill, Inc., St. Peterborough, US.
Influence of Visual Technology on the Evolution of Language Environments Oct. 1, 1989, Computer, IEEE Computer Society, Long Beach, CA—US.

* cited by examiner

Primary Examiner—Wei Y Zhen
Assistant Examiner—Chih-Ching Chow
(74) Attorney, Agent, or Firm—Joseph T. Guy; Nexsen Pruet, LLC

(57) ABSTRACT

In order to enable persons without particular programming knowledge to themselves write their own computer programs, there is proposed a computer-supported method of producing and/or executing program code, with at least one visualization surface for the representation of establishable objects, by way of which information, in particular data, are inputted and outputted when executing the program code, wherein objects of the visualization surface are writingly and readingly accessed by means of the produced program code. The method according to the invention is distinguished in that program components of the category run and function are provided for selection, and in addition instructions for interconnecting program components which regulate the call-up of the program components and their serial or simultaneous execution. The invention also concerns a corresponding system with an execution environment for carrying out such a method.

18 Claims, 10 Drawing Sheets

SYSTEM AND METHOD OF PRODUCING COMPUTER PROGRAMMING

Figure 1:
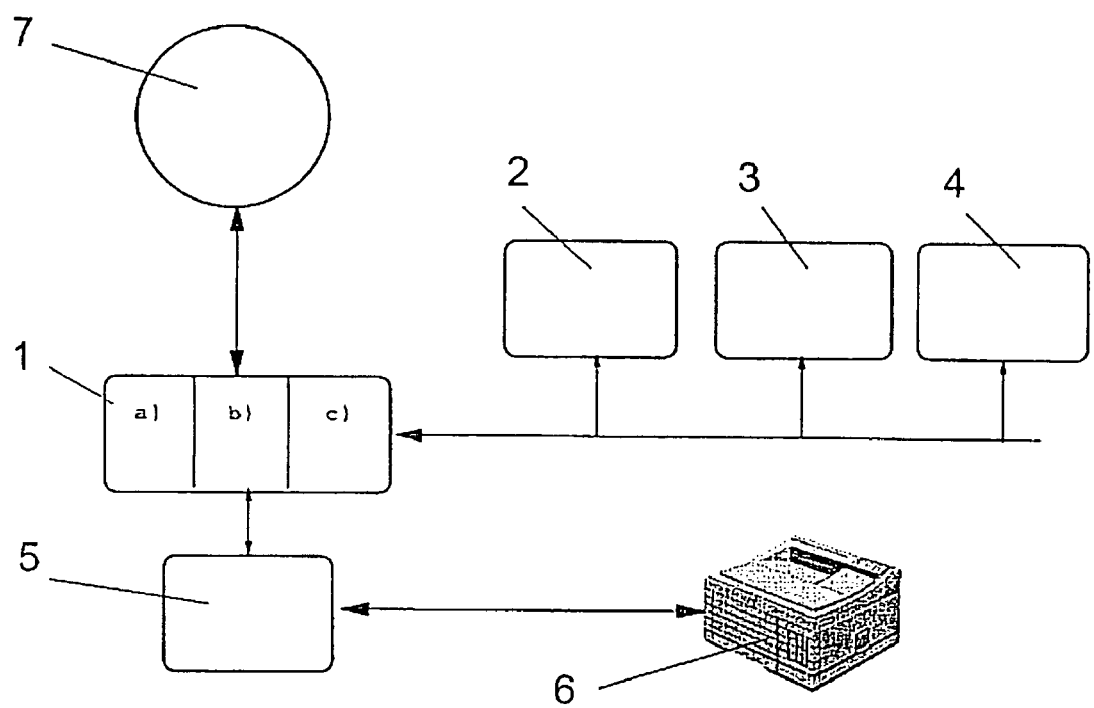

The invention concerns a computer-supported method of producing and/or executing program code, with at least one visualisation surface for the representation of establishable objects, by way of which information, in particular data, are inputted and outputted when executing the program code, wherein objects of the visualisation surface are writingly and readingly accessed by means of the produced program code, as well as a corresponding system with an execution environment, in particular for carrying out such a method.

At the beginning of the development of PC technology in the first half of the Eighties, anyone who was interested in technology was able to write small programs for a personal computer. Programming languages such as Basic were simply structured and quick to learn. In that respect many people were able to write their own programs both for professional and also private purposes. In the course of development both the hardware and also the software became progressively more powerful, with the result however that the demands on the level of training and education of the programmers increased considerably. Ultimately the result of the development involved was that present-day programming systems on the basis of modern programming languages such as Delphi, C++ or Visual Basic can be operated only by few people. Ultimately the production of programs in modern times is reserved for trained specialists such as information technologists. It is only possible to get into the subject if at least courses relating to the operation of such programming systems are attended or expensive private study courses are followed, The article 'LabView: Laboratory virtual instrument engineering workbench' in the journal BYTE, pages 84 ff, Sep. 1986, describes a programming environment for producing virtual measuring instruments which include front panel and block diagram fields, wherein a graphical programming language is included for forming the front panel and block diagrams. Program code portions are represented in a visualisation surface in the form of block diagram fields, the fields being connected by way of connecting lines indicating the data flow. As the block diagram represents a data flow chart, consecutive block diagrams are executed in time succession. The starting point of such a data flow representation is always a data source and the end point is generally a data display.

The object of the invention is to enable persons without particular previous knowledge in the field to themselves write their own computer programs in the form of software code so that the cost and effort which is otherwise required for learning to operate the programming system can be avoided.

In terms of the method the invention attains that object by a computer-supported method of producing and/or executing program code as set forth in claim 1, or a system having an execution environment for such a method as set forth in claim 20. The method according to the invention is distinguished in that program components of the categories run and function are provided for selection, and in addition also instructions for interconnecting program components, which regulate the call-up of the program components and their serial or simultaneous execution.

The user is taught to structure the task by virtue of the fact that only a few program components from two categories are provided for the user with computer aid for producing the program code. The predetermined rules for interconnecting the program components automatically establish the sequence or run when processing the program code which is composed of the individual program components. That therefore involves computer-supported guidance for the user in writing the computer program. Programming in the conventional sense, in which a program code is keyed in, is not required with the computer-supported method according to the invention or the system according to the invention. In that respect the invention now enables even people who are not specialists in information technology to write a computer program without knowledge in a programming language being necessary.

It is desirable if program components in the category run are serially interconnected and in the case of a branching of the program course are guided by the establishment of a condition to one of a plurality of different sequences or runs. In addition it is desirable if components of the category function are executed in parallel so that the components of the two categories run and function differ in that they operate either simultaneously or serially, that is to say in succession. In that respect it is a matter for the discretion of the user to select predetermined program components from one of the two categories, that is to say to decide what type of component he is using for what part of the task. In accordance with the invention, in the program component category run, the system provides the component types run component, start component, event component and end component. Those run components are generally serially interconnected by the system, thereby establishing that execution thereof takes place chronologically. By virtue of the described predetermined regulation in regard to interconnecting the program components, there is only ever one program component in the category run that can be active at a predetermined moment in time. In that respect it is desirable if, as already stated hereinbefore, runs permit conditional branchings.

For the sake of completeness it should be pointed out that the identification of the two categories of the program components is not relevant in accordance with the invention. In that respect the identifications run and function respectively can also be used in any desired manner. The sole prerequisite is that the program component types in a category are generally serially interconnected so that there is only ever one of those components that is active and in addition a component type in the other category is executed in parallel, that is to say simultaneously with one or more component types in the other category, which is here referred to as function. That deals with tasks which are executed in parallel, that is to say simultaneously with runs.

In the system according to the invention the component type start component in the category run is so adapted that it calls up another type in the category run, with the exception of the component type event component. That can therefore be a run component or an end component. In addition the start component can also call up a function component which is associated with the category function.

A further desirable rule, which is executed with computer support, for interconnecting the predetermined program components, provides that the event component is called up by events which can occur in the program sequence or run, and which in turn calls up a run component, an end component or a function component. That therefore establishes in the system according to the invention that the start of a run is effected either by a start component or an event which is executed in an event component. An event which triggers the start of a run can be for example interactive actuation of an operating object on the visualisation surface.

Desirably, with the predetermined rules for interconnecting the program components, a run component can be called up either by a start component, an event component or another sequence or run and in turn can call up a run component, an end component or a function component. It is desirable in that respect if there are conditional branchings in such runs.

In accordance with the predetermined interconnecting rule the type end component forms the conclusion of each run. It is called up either by a start component, an event component or a run component. It can in turn call up a function component.

In the context of presetting the interconnecting rules, it is possible to establish that the function component can be called up either by a start component, an event component or a run component. In that case the function component deals with its task in parallel relationship with the calling-up components.

In addition it is helpful in terms of writing program code for the user if, in the system according to the invention, associated with the selected program components is a respective symbol which is represented in a structure diagram. In that case, a predetermined symbol for representation in the structure diagram can be associated with each type of program component. After selection of the components the system, having regard to the above-mentioned rules for interconnection of the program components, uses those symbols automatically by means of lines for representing serial or parallel execution, whereby the program structure and the program course are represented. The system automatically produces arrows in the connecting lines between the symbols of the program components in the structure diagram, thereby indicating the program course so that the system according to the invention facilitates detection of the program structure for the user.

A further improvement in the structure diagram is achieved in that symbols for program components in the category run are or become arranged in relation to symbols for program components in the category function basically on mutually perpendicular paths. For example it can be provided that symbols of the serially interconnected program components are basically arranged vertically and the program components operating parallel to the calling-up components are basically arranged horizontally. In that respect the term 'basically' signifies that, in the case of a program branching into a plurality of runs, a horizontal displacement can be provided in respect of the arrangement of the symbols and in the case of a call-up of a plurality of functions from a component of the type run there can be a vertical displacement between the function components.

Those representation rules in respect of the structure diagram, which are based on the above-described interconnecting instructions of the different program components, further provide that the connecting lines between the program components of a run basically extend vertically and the connecting lines from the calling-up components of the type run to the respective called-up function components basically extend horizontally.

It will be appreciated that, with the specified representation rules, the two directions horizontal and vertical respectively are interchangeable without thereby departing from the scope of the invention. In that sense it may be desirable if, in the structure diagram, symbols of the components of the category run are basically arranged horizontally and symbols of the components of the category function are basically arranged vertically.

It can be desirable if the system according to the invention for computer-supported production and/or execution of program code provides a development mode and a run time mode, wherein in the run time mode a program code produced in the development mode is executed and the symbols whose program instructions are just being executed are characterised in the structure diagram. That can be implemented for example by a color change or another marking in respect of the respective symbol which is associated with the program component which is just being executed.

Operation of the system according to the invention can be facilitated by a symbol of a program component in the structure diagram representing a virtual program container, wherein access to the program code of the respective program component is effected by opening the program container, for example by selection such as clicking on the symbol. In accordance with the method according to the invention, upon opening of the program container, a new display surface is produced, in which the program code of the program component in question can be processed. Advantageously, for each component which is displayed in the structure diagram in the form of the respective symbol, the system according to the invention can provide a provisional program code comprising an initial line and an end line of the program component. Program instructions can now be applied by the user with computer support between those two program lines.

In order to keep the method according to the invention uncomplicated it can be provided that the system according to the invention affords the user only two program instruction categories for selection upon insertion of a program instruction, in particular the instruction categories query and action. That in turn facilitates computer-supported guidance for the user in producing the program code. Ultimately this must involve only the decision as to whether, with the corresponding program instruction, an item of information is required (query) or whether a command is to be executed (action). It is in turn appreciated that identification of the instruction categories 'query' or 'action' respectively is interchangeable with any other identification. At any event however an item of information is acquired in the one category and a command is executed in the other program instruction category. In addition it is also possible to insert so-called information lines or comments which however are irrelevant in terms of the program sequence or run.

It is desirable if, with the query instruction, states such as operator actions, input parameters, database queries and states of external devices and sensor values are ascertained. For example it is possible to query whether a temperature has exceeded a predetermined value, whether a container is filled, whether a unit is switched on or whether a key or button was actuated. It is ultimately possible with the query instruction to detect any state or value. It is desirable if the query instruction involves the underlying structure 'if (logical operation) then', in which respect similar query instructions such as 'if not (logical operation) then', 'if . . . then', 'if (logical operation) then repeat' are also possible.

Advantageously, an action instruction, that is to say a command, permits any operation, in particular process control, a representation for information in respect of the operating personnel, the storage of data (documentation), mathematical operations (for example calculating formulae), program-engineering operations such as for example loops, allocations and so forth.

As the man skilled in the art realises, a query instruction with 'if (logical operation) then' implies action instructions. It is only if the query is answered with logic 1, that is to say true, that the specified action occurs. At any event the user of the system according to the invention is only given the possibility of selecting either an action instruction or a query instruction for the insertion of program instructions into a program container of a program component.

If the user would like to insert a new program instruction, in particular in the form of a program line, the instruction categories query and action are automatically displayed. The corresponding program instruction is inserted by virtue of selecting one of those two categories. In that respect it is desirable if the inserted instruction occurs in the form of a virtual instruction or an instruction in plain text which subsequently with computer support the user can convert into a real, executable program instruction. In that respect it may be desirable if given parts of the virtual program instruction are replaced by way of a plurality of selection processes so that ultimately this gives the executable program instruction, in particular in a predetermined high level language. It is essential in that respect that the user is 'positively guided' by the system according to the invention so that ultimately programming errors are excluded.

It is desirable in that respect if the system according to the invention proposes selectable program instructions which include at least one so-called keyword. Such a keyword serves as place holder for at least one further keyword and/or at least one program instruction portion. Those keywords are to be viewed as unfinished parts of an instruction. They are substitutable by further keywords, instruction, variable, objects, properties of objects, computing signs, logical operators, formulae and the like. Those keywords are necessarily replaced by executable program text in the course of the method according to the invention.

It is only when all keywords in the plain instruction have been replaced by executable program text that the instruction is finished.

In accordance with the invention, for that replacement of the keywords, a particularly advantageous method is carried out by means of selection lists, wherein such a selection list is associated in the system according to the invention with each keyword. Such a selection list has a plurality of replacement texts with which the keyword can be replaced, wherein such a replacement text includes in particular an executable program text like those specified hereinbefore or also a further keyword. In accordance with the invention the method provides that, in the choice of such a keyword, the associated selection list from which the user selects a suitable position is displayed in the inserted virtual program instruction. Advantageously, that operation of replacing keywords in an inserted virtual program instruction can be continued until all keywords have been replaced by an executable program instruction portion. This method according to the invention for the production of a program code enables anyone to produce a computer program with computer support without particular previous experience and training, as the contents of the individual list points of the respective selection list are of such a nature that they produce a syntax error-free program code when they replace the keyword.

In that respect it may be advantageous if the keywords are clearly emphasised in the virtual program instruction, for example by underlining or by a colored identification.

It can be particularly desirable if the selection lists also include program instructions such as allocations, loops or call-ups so that ultimately the entire programming tool can be provided for the user with computer support and in dependence on the situation involved. In that respect there is also no need to provide a manual for operation of the system according to the invention or for implementation of the method according to the invention.

Ultimately, with the invention, it is unnecessary for the user to learn a programming language in order to produce a program code which can be executed on a computer. In that respect the system according to the invention can be so designed that the user only has to input values of constants and as a one-off the name or identifier of variables, objects and so forth, but no program text in the form of program instructions. The program text is produced automatically for example by means of an input means such as a computer mouse so that syntax errors in the program are excluded. In addition illogical or meaningless program sequences are completely avoided as the selection list, as a replacement for the respective keyword, permits only meaningful and logical entries. The consequence of this is that, with the method according to the invention and the system according to the invention, error messages in production of the program code or the compilation and/or execution thereof, as are required in the state of the art, are completely unnecessary. In contrast however it may be advantageous if an error message is displayed in those situations in which the attempt is made to cause the program code to run, although at least one of the keywords in one of the program portions of a program component has not yet been replaced as described.

In addition it may be desirable if objects applied by the user, in particular visualisation objects, parameter objects, variables, program components applied in the structure diagram and so forth are automatically incorporated into the respective selection lists with their individual identifiers. That ensures that all possible program text portions with which a keyword can be replaced are also displayed in the respective selection list. As desirably program commands such as allocations, loops, call-ups can also be included in the selection lists, the extent of the selection lists depends on the power of the language employed and the number of objects applied by the user.

In addition it may be desirable, if the option exists in the system according to the invention, to establish which properties of objects are included in the selection lists. In that way the extent of given selection lists which include object properties can be restricted.

In addition however it may also be advantageous to provide an expert mode for which selection lists are provided, which permit access to all properties by the program to be produced. In the normal mode in contrast access to the important properties is provided by pre-setting. Those pre-settings can be altered by the user in the system according to the invention and thus adapted to his individual wishes and capabilities.

As the man skilled in the art will realise the system according to the invention for computer-supported production and/or execution of program code can already be provided by an execution environment which includes an input means such as a keyboard and/or a computer mouse, a representation means such as a monitor and a data processing means such as a processor device and a memory means into which a software code with which a method according to the invention can be carried out can be loaded. A conventional PC is entirely adequate as hardware for carrying out the method according to the invention.

As the man skilled in the art will also realise the invention comprises a plurality of basic ideas which are also to be viewed as being independent of each other:

the computer-supported provision of only two categories of program components (run, function) which contain the program instructions, the computer-supported provision of a structure diagram which clearly represents the co-operation of the program components, the computer-supported provision of program instructions of only two categories (query/action) whereby there is provided a computer-supported method which facilitates conversion of the programming task into the program code, and a special, computer-supported method for producing program instructions without the respective program-code having to be keyed in by the user.

Figure 2:
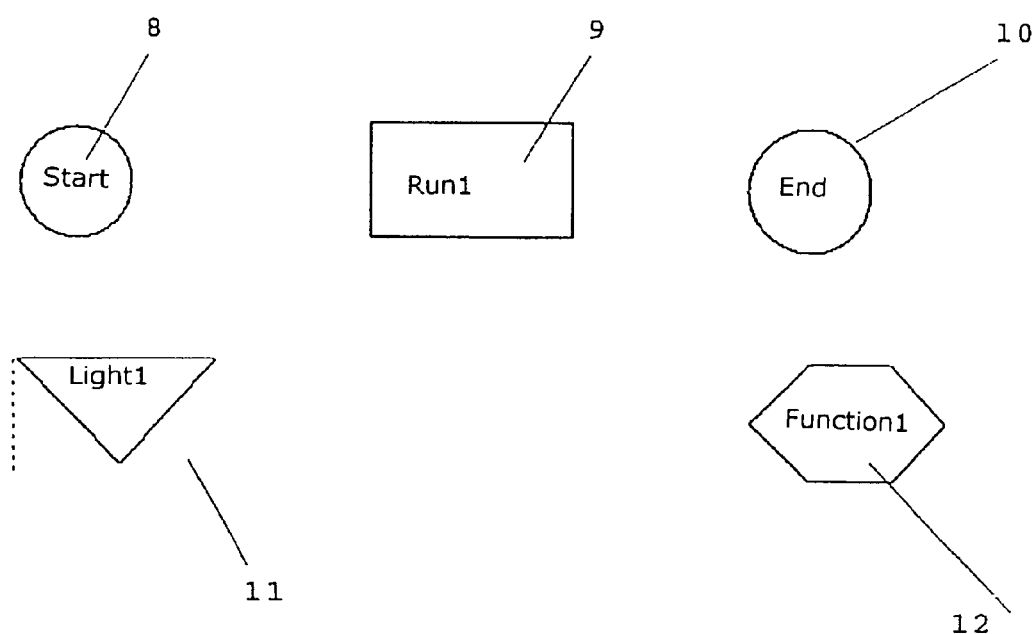
Figure 3:
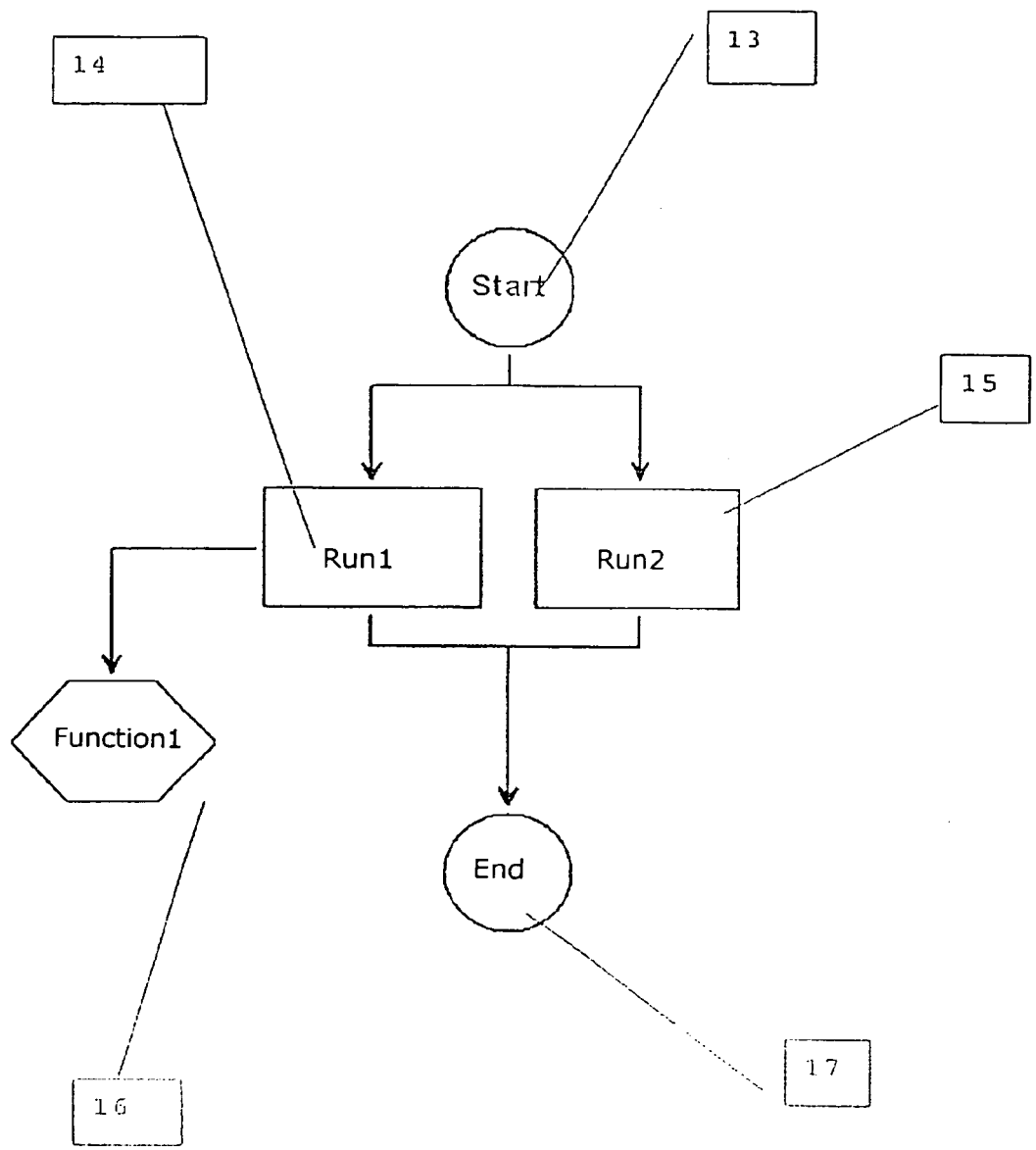
Figure 4:
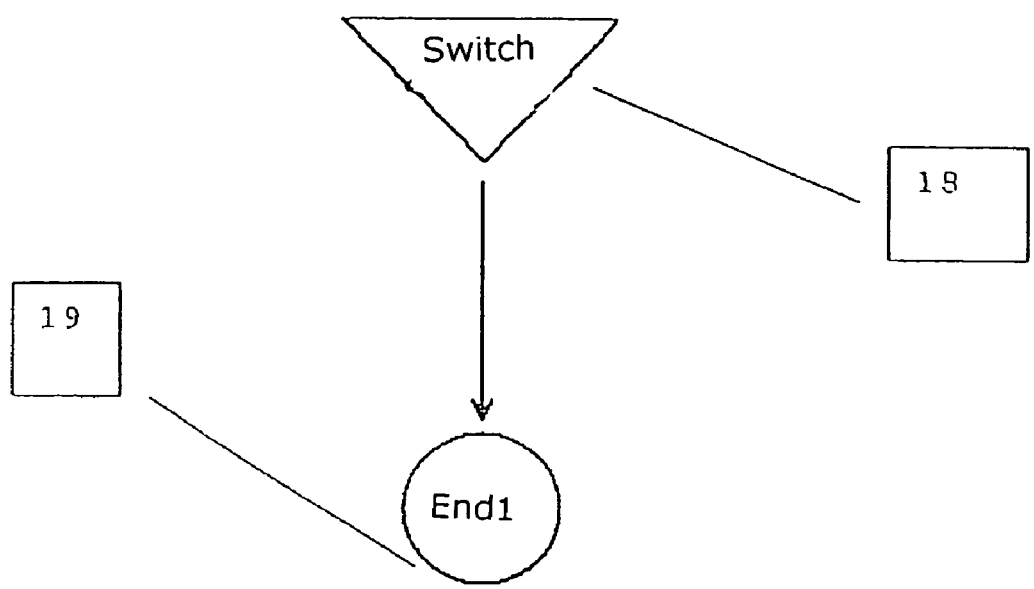
Figure 5A:
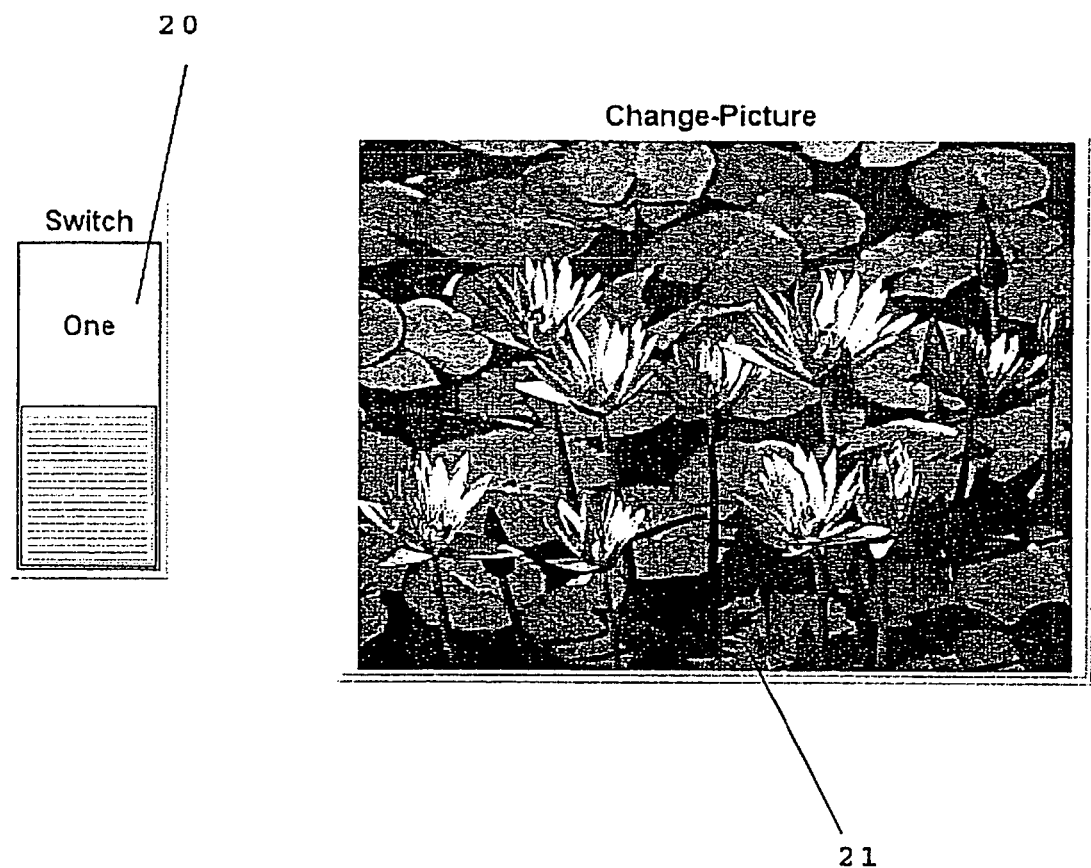
Figure 5B:
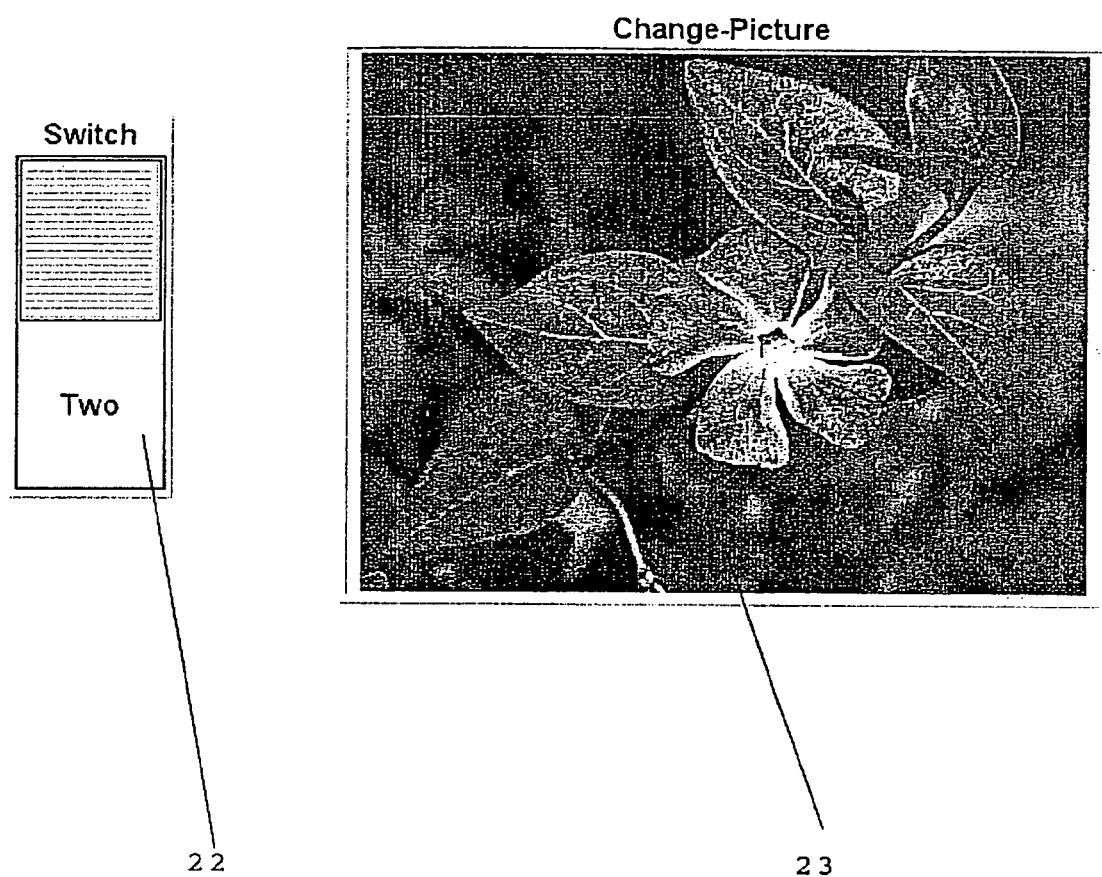
Figure 5C:
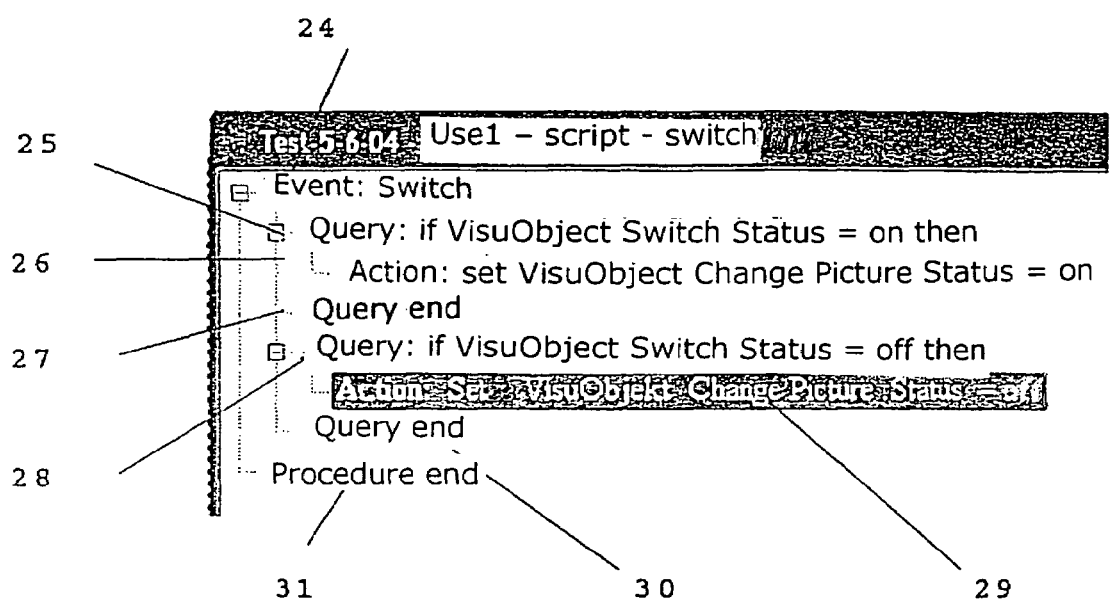
Figure 6A:
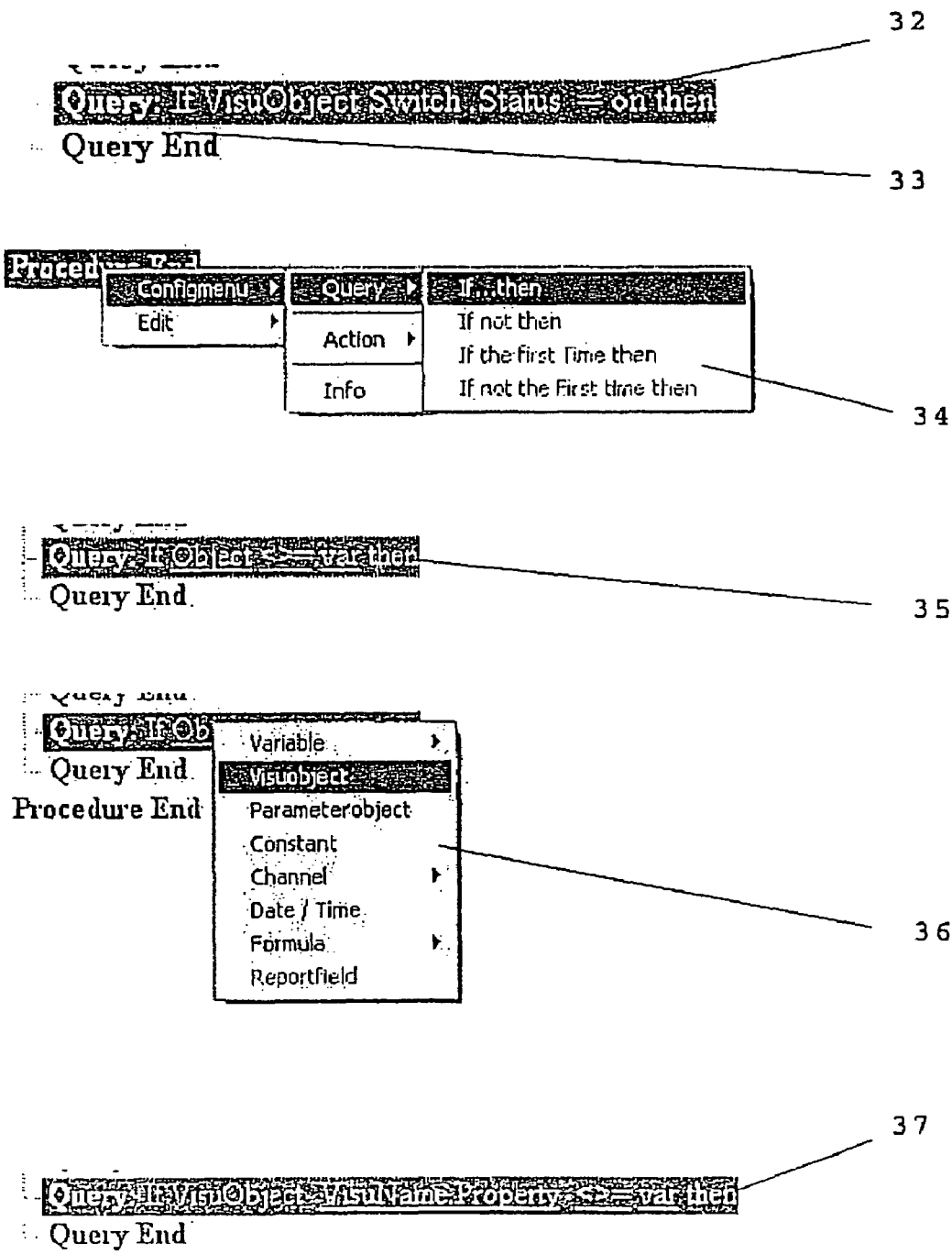
Figure 6B:
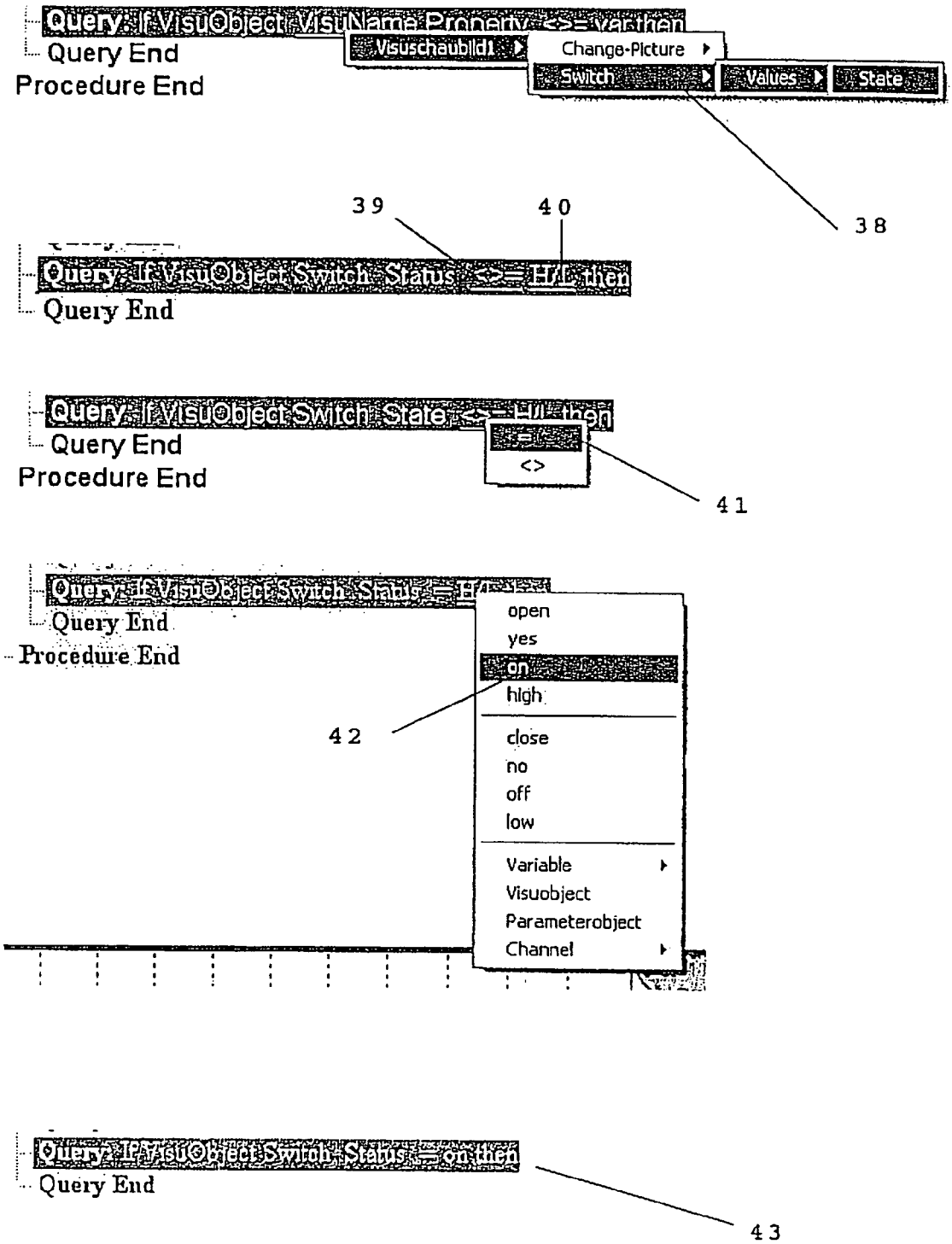
Figure 7:
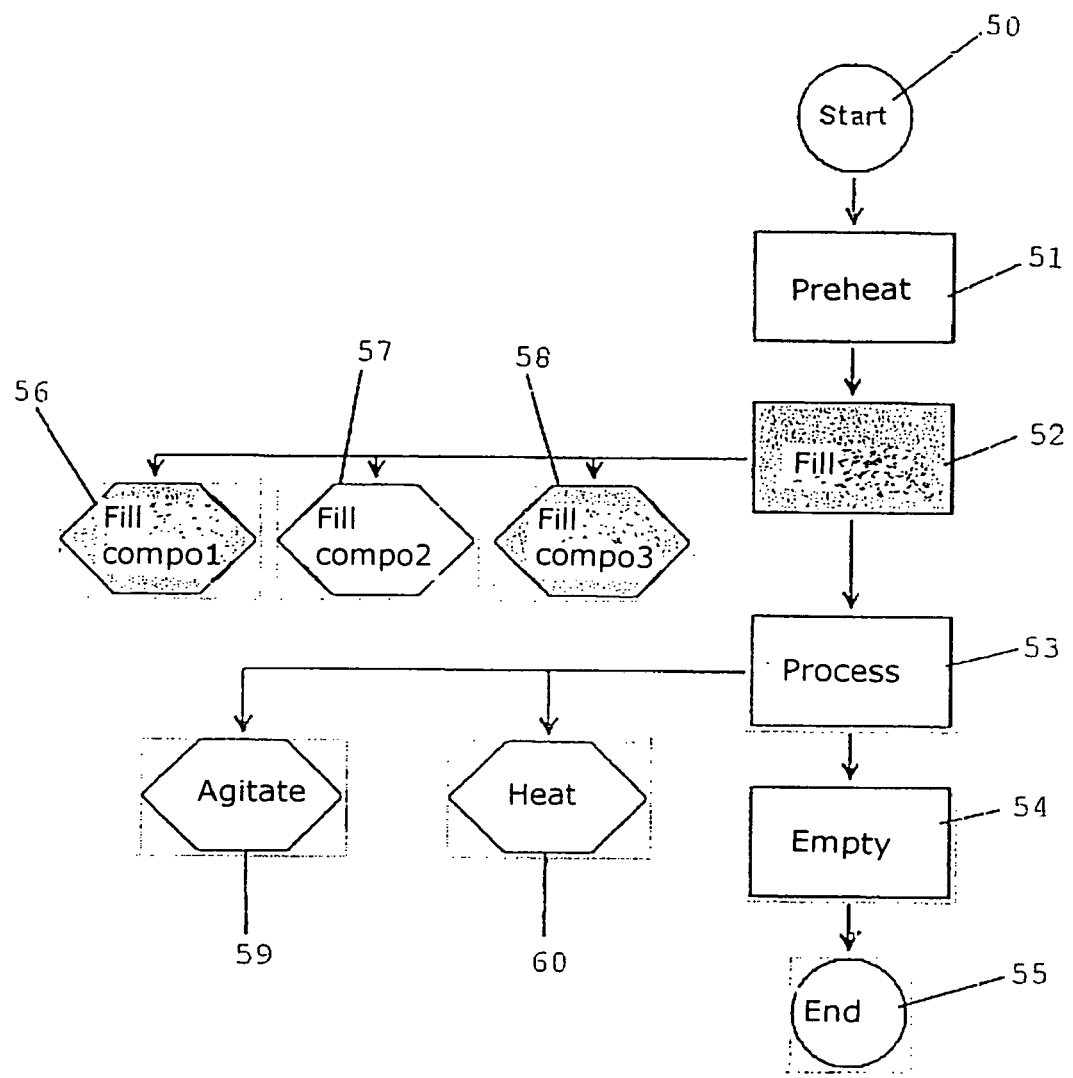

The invention is described hereinafter by means of an embodiment with reference to the accompanying drawings in which:

FIG. 1 shows the diagrammatic structure of a programming system according to the invention, FIG. 2 shows program component symbols of a structure diagram, FIG. 3 shows symbols by way of example, each representing a respective program component, FIG. 4 shows an example of a run which is started by an event component, FIG. 5a shows a portion of a visualisation diagram with the output 'picture A', FIG. 5b shows the same portion of the visualisation diagram with the output 'picture B', FIG. 5c shows the program code written in accordance with the invention for displaying the pictures 'picture A' and 'picture B', FIGS. 6a and 6b show by way of example the writing of a query instruction without the need for keying in a program instruction, and FIG. 7 shows a process represented in a structure diagram according to the invention.

FIG. 1 is a diagrammatic view showing the principle of a system according to the invention with an execution environment for the computer-supported writing and execution of program code. It includes a PC 1 which has a data processing means 1a in the form of a CPU, memory means 1b for the storage of software code for carrying out the method according to the invention, for storing a database during execution of the method and for storing the computer-supportedly written program code and input means 1c in the form of a keyboard and a computer mouse. The PC 1 is further connected to display means in the form of monitors 2, 3 and 4 on which a visualisation diagram, a parameter diagram and a structure diagram are represented. The PC 1 further has an environment interface 7 with which the system can communicate outwardly. The computer is also connected by way of an interface 5 to a printer 6.

The parameter diagram 2 serves to display parameters which are inputted by way of the keyboard 1c. Thus it is possible to input data which influence the subsequent program sequence or run. In that way it is also possible to specify data for a later run operation when a program which has been written is just running. Parameter data files for later program runs can thus be provided. The visualisation diagram 3 serves on the one hand for preparing objects during program production and also for observing the objects while the program code written is running. The structure diagram 4 serves essentially for structuring the programming task during preparation of the program code. When the written program code is running, it is possible in the run time mode by way of a marking of program components or symbols thereof to display which program components or which program component is just being executed.

During the run time access to the written program code which is also stored in the memory 1b is denied to the user. It can be processed in the development mode by way of the monitors 2, 3, 4. The printer interface 5 also includes a configuration of the data output in the form of forms which are issued by the printer 6. In the indicated embodiment the system has an environment interface for connection to sensors with which measurement data can be detected. In addition control signals which control external processes can be outputted by way of that interface.

By means of the system shown in FIG. 1, the user can select in the structure diagram with computer support different types of program components which are then displayed in the structure diagram. Those program components are represented as symbols and can be dragged on to and arranged on the surface in the structure diagram. They are then connected by the system automatically with predetermined rules by way of lines, thereby establishing the framework of the program to be produced. Ultimately any desired program can be produced with that computer-supported arrangement of program components. Access to the program code portion of the component is made possible by selection of the respective component or symbol.

FIG. 2 shows a plurality of symbols each representing a respective program component, as are used in a structure diagram. Belonging to the component category run are the types run component 9, event component 11, start component 8 and end component 10. Runs are serially linked by the system, whereby the mode of operation thereof is chronological. Thus, there is only ever one component of the category run that can be active at a given moment in time. Runs permit conditional branchings.

The Figure also shows a component type function component or the symbol 12 thereof, which belongs to the component category function. Functions deal with tasks which are implemented simultaneously, that is to say parallel to runs.

Program components can be interconnected in accordance with predetermined rules in the programming system according to the invention. For example the start component 8 calls up another type of component in the category run, beside the event component 11. That can be a run component 9 or an end component 10. In addition the start component 8 can also call up a function component 10.

The event component 11 is called up by events which can occur in the course of the program and in turn can call up a run component 9, an end component 10 or a function component 12.

The start of a run can therefore be effected by a start component 8 or an event component 11. An event which triggers the start of a run can be for example the choice of an operating object in a visualisation diagram.

The implemented interconnection rules also establish that the run component 9 is called up either by a start component 8, an event component 11 or a run component 9 and in turn can call up a run component 9, an end component 10 or a function component 12. Conditional branchings are also possible in runs.

The interconnecting rules of the described embodiment further provide that the end component 10 forms the conclusion of a run. It is called up either by a start component 8, an event component 11 or a run component 9. It can in turn call up a function component 12.

That function component 12 operates in parallel with runs. It is called up either by a start component 8, an event component 11, a run component 9 or an end component 10. The function component 12 itself cannot call up any program component.

The system offers the user for selection only the specified program components which can be allocated to the categories of run and function. Those selected program components are then displayed in the structure diagram as shown in FIG. 2 by means of associated symbols which under some circumstances can be provided by the user with an identifier such as a name.

FIG. 3 now shows a structure diagram in which the system has automatically joined the program components together by means of lines, thereby clearly indicating the course of the program and the program structure. Whenever a further symbol representing a program component is applied by the user to the structure diagram, then, depending on the respective type of the new component, the arrangement of that symbol and the connection to the calling-up symbol is effected automatically in accordance with the predetermined rules by the system according to the invention. The illustrated symbols 13 through 17 serve to represent associated program components.

In accordance with the above-specified rules for linking the program components, the symbols 13 through 17 are arranged by the system and automatically connected with lines so that the program run and the program structure are represented. The arrows in the connecting lines between the symbols indicate the program run. The program structure is also represented by the basically vertical arrangement of the serially linked run components 13, 14, 15 and. 17 while the function component 16 which operates in parallel is arranged horizontally with respect to the calling-up run component run 1.

The connecting line to the function component 16 is of a basically horizontal configuration, wherein vertical displacement is necessary by virtue of the arrangement of the symbols. The connecting lines between the start component 13 and the two run components 14, 15 are of a basically vertical configuration, with a horizontal displacement being necessary by virtue of the arrangement of the symbols.

The symbols of the structure diagram in FIG. 3 serve as virtual containers for the respective program code portion. Access to the program code portion is effected by clicking on the symbols. A window thereupon opens, in which the program code portion can be processed.

In the described embodiment the system according to the invention provides a development mode and a run time mode, the program code which is produced being executed in the latter. At the start of the program, in accordance with the view shown in FIG. 3 firstly the program code portion which is associated with the symbol 13 of the start component is executed. The start component 13 can call up either the run component 'run 1' 14 or the run component 'run 2' 15. Provided for that purpose in the program code portion of the start component 13 is a conditional branching which provides that either the run component 14 or the run component 15 is called up.

As shown in FIG. 3 the run component 14 conditionally or unconditionally calls up the function component 16. The program code portion thereof is executed in parallel with the run comprising the program components 13, (14; 15) and 17.

The function component 16 differs from the sub-procedures known in conventional programming languages. Such sub-procedures interrupt the program run. In contrast the function component 16 is executed in parallel with the calling-up part of the program and thus represents a novel element. That function component can advantageously be used in time-intensive processes which can then run in parallel. Depending on the respective application involved in that case the calling-up program component is to be interchanged with the called-up program component data.

The run components 14, 15 each unconditionally call up the end component 17. No condition query is effected here as the course of the program is effected either by way of the run component 14 or the run component 15. Program portions which must be executed prior to conclusion of the program can be contained in the end component 17. In a particular embodiment provision is made in the end component for storing the results and producing printouts (see FIG. 1).

FIG. 4 shows a structure diagram with an event component 18 which is concluded by an end component 19. The event component 18 is called up by events which can occur in the program run and in turn can call up a run component, an end component or a function component. Such events can be for example operating procedures which are triggered by clicking on visualisation objects in visualisation diagrams. Events of that kind can occur at any time during the run time of the program produced.

The event component 18 starts a run which differs from a run as shown in FIG. 3, only by the nature of the start. While a run as shown in FIG. 3 can occur only once in an application, runs corresponding to FIG. 4 can occur in any number, being executed in parallel. Those runs as shown in FIG. 4, which are started by the event module 18, operate independently of each other and also independently of a run as shown in FIG. 3, which is started by a start component 13. That also clearly indicates the difference in relation to the function component 16. Admittedly, that also operates in parallel with a run, but it is called up by a program component of the type run by way of a data channel and is thus associated with that run.

The event component 18, as shown in FIG. 4, is serially connected to the end component 19, wherein once again that connection is produced automatically by the system. It is possible to dispose in both components any program code portion which is executed when the event triggering the run occurs.

FIGS. 5a through 5c show the application according to the invention of objects, and the corresponding program code portion of an event component in which the objects produced are used.

Attention is firstly directed to FIG. 5a showing a visualisation monitor with a switch object 20 and the individual name 'Switch' in a switch position 'One'. Also shown is a picture object 21 with the individual name 'Change-Picture', involving the output of one of two pictures. Such a visualisation diagram serves for operation and observation when executing the program produced. In contrast FIG. 5c shows the program instructions which produce the desired program procedure.

FIGS. 5a and 5b represent the same visualisation objects. In FIG. 5a the switch 20 with the individual name 'Switch' is in the position 'One' while in FIG. 5b the same switch is in the position 'Two'. A picture object 21 and a picture object 23 respectively is associated with each respective switch position. Depending on the switch position 20, 22, either the picture corresponding to 21 or the picture corresponding to 23 appears. The picture object can thus represent two different pictures, on the basis of its definition.

The task of the program run shown in FIG. 5c is, upon actuation of the switch 22, 23 from one of the two positions 'One' or 'Two' into the respective other position, to change the picture of the picture object 21, 23 from 'Picture A' 21 to 'Picture B' 23 and vice-versa. Accordingly the position 'One' is associated with the picture 21 and the picture 23 is associated with the position 'Two'. An event program component as is represented by the symbol 18 in FIG. 4 corresponds to that run, in the structure diagram. FIG. 5c represents the program code portion corresponding to that event program component. As already explained hereinbefore, the user can open that program code portion by selecting the program component 18. The program code portion which then opens is illustrated in FIG. 5c after the expansion thereof. The lines 21 and 24 are automatically applied when applying the run in the structure image. They characterise the type of instruction event and the name 'Switch' of the run. The name of the corresponding object 20, 22 is used automatically by the system on the visualisation surface so that here the user does not have to implement any further input.

Now with computer support the user can add additional program instructions which are either instructions of the category query or the category action. The mode of such addition is described in greater detail hereinafter.

On the basis of the presettings, the added program instructions 25 through 30 are either query or action instructions. The query instructions 25, 27 and 28, 30 respectively are so-called block instructions comprising two lines. They generally include further instructions, wherein there is a logical relationship between the block instructions and the instructions included in the block instruction.

The event component illustrated in FIG. 5c, in the form of its program instruction, is linked to the visualisation object 'Switch' 20, 22, wherein the event is triggered when the switch 20, 22 is switched over. That program implementation is started by the user in the visualisation surface by actuation of the switch.

More specifically the lines 25, 26 and 27 represent an instruction block, in which respect the line 25 is an if . . . then instruction. It signifies that the action instruction 26 is implemented if the switch is in the position '21'. It then sets the visualisation object 21, 23 to the status 'on', which corresponds to the picture 21. In that respect the picture 21 is represented upon actuation of the switch into the position 'on'.

In the same manner the lines 28, 29 and 30 also represent an instruction block, the if . . . then instruction in line 28 causing the action instruction 29 to be implemented if the switch is in the position 22, that is to say in the position 'off'. With the action instruction 28, the visualisation object 21, 23 is set to the status 'off' which is associated with the picture 23. In that respect the picture 23 is represented when the switch is in the position 'off'.

The specified program code produced with the system according to the invention provides that, whenever the switch is switched over, in the visualisation diagram, execution of the program code shown in FIG. 5c is started, whereby the visualisation object 21, 23 changes the picture.

Reference will now be made to FIGS. 6a and 6b to describe the insertion according to the invention of a program line into a program component by means of keywords and corresponding selection lists. In that way the user is in the position of producing program code without having to key in a single line himself. Depending on the respective embodiment involved, the selection lists include further keywords, program instructions, variables, objects, properties of objects, computing signs and/or logical operators. The lines 32 and 33 show the finished instruction, the production of which is described hereinafter, see FIG. 6a. The aim accordingly is to produce an if . . . then block instruction. That instruction expresses the fact that action instructions which can be inserted between the lines 32 and 33 are implemented only when the result of the logical operation in the if . . . then block instruction is true.

The first step in the insertion of a new instruction is linked to the display of a selection list 34 which is in the form of a context menu. As can be seen, for the insertion procedure, the system offers either a query or an action as the two possible categories of instructions. In the present case the query instruction is selected, in that respect the selection list 34 for the query instruction is automatically displayed. Now, by way of the mouse, the user can select one of the displayed query instructions in the selection list 34 and actuate it with a click. In response thereto the system inserts the new line 35 which can be used as the plain form of an if . . . then instruction or as a virtual instruction. The line 35 has three keywords which are underlined for identification and which must be replaced in succession by executable program text, program text portions or further keywords.

In that respect the user firstly selects the keyword 'object' of the line 35 by clicking thereon, whereupon the selection list 36 of the keyword 'object' opens. That selection list 36 represents all possible program texts or program text portions or keywords with which the selected keyword 'object' can be replaced. In the present case, the line 'Visuobject' is selected in the selection list, whereby access to the objects of the visualisation diagram shown in FIGS. 5a and 5b is possible. As can be seen from the Figure the keyword 'object' is replaced by 'Visuobject Visuname Property'. This means that the keyword 'object' has been replaced by the text component which comprises the object category 'Visuobject' and the new keyword 'Visuname Property'.

As the next task accordingly the new keyword 37 must be replaced, with which access is made possible to the properties of the visualisation objects 20, 21. By selecting and clicking on the keyword 'Visuname Property' in the line 37, the associated selection list 38 opens, see FIG. 6b.

The extent of the selection list 38 is dependent on the number of applied visualisation objects and the number of properties of the individual visualisation objects. As soon as a further visualisation object is applied in a visualisation diagram, the system according to the invention automatically expands the selection list 38. In the present case the marked line 'Switch/Status' of the selection list 38 is selected, which is reflected in the subjacent instruction line which does not yet represent an executable instruction as it has further keywords.

In the described embodiment of the system according to the invention, the user is free to determine, for each visualisation object, which properties of objects or a given object are to occur in the associated selection lists. Ultimately, for all objects which occur such as for example in parameter diagrams, visualisation diagrams, print objects, variables and so forth, associated selection lists are automatically produced by the system according to the invention so that, except for the above-specified exception, the user does not have to perform any inputs of his own in that respect.

In the example shown in FIGS. 6a and 6b, the remaining keywords 39 and 40 which represent the logical operation of the query are still to be established. By virtue of selecting the keyword 39 the selection list 41 thereof is opened. The logical operator '=' is selected. As can be seen in the line therebeneath, the keyword 39 is thereupon replaced by the equals sign. Subsequently the keyword H/L 40 is selected so that its selection list 42 automatically opens. The terms specified in the list 42, 'open; yes; on; high' represent synonyms for a logic 1 while the terms 'close; no; off; low' represent synonyms for a logic 0. The further points of the selection list 42 are objects and object properties. In the present case, 'on' is selected in the selection list 42, which is reflected in the instruction line 43 which is now complete and executable. That block instruction therefore represents the finished result within the programming system according to the invention, which has been produced by a few mouse clicks.

Any program can be produced with computer support in that way for a user without particular knowledge.

FIG. 7 shows a production process which is illustrated in a structure diagram according to the invention, which is controlled by means of the method according to the invention by execution of program code which is associated with the individual symbols of the structure diagram. That production process, after the start of the process, includes preheating of a mixing chamber, the simultaneous filling of 3 components into the mixing chamber, and subsequent processing by simultaneous mixing and heating of the material to be mixed. After complete thorough mixing of the 3 components the mixing chamber is emptied and the process is concluded.

The specified process is started in the structure diagram by the start component 50 and is represented by the run components which are to be executed in succession in respect of time, namely 'preheat' 51, 'fill' 52, 'process' 53 and 'empty' 54. The run is terminated by the end component 55. As stated the run component 'fill' 52 calls up the function components 'fill compo1' 56, 'fill compo2' 57 and 'fill compo3' 58, which are all executed in parallel with the calling-up component. In that respect the above-mentioned 3 called-up function components also run simultaneously with each other, that is to say the 3 mixture components are simultaneously filled into the mixing chamber by different procedures. That is followed by execution of the run component 'process' 53 which itself calls up the functions 'agitate' 59 and 'heat' 60 which are again executed simultaneously with the calling-up component 'process'. After complete execution of the program code of the run component 'process' 53, the run component 'empty' 54 is executed and thereafter the entire process is concluded by the end component 55. The content of the individual components, that is to say the program codes associated with the individual components, are sub-processes which in their entirety afford the complete process. As already stated hereinbefore, the connections between the individual components in the structure diagram in FIG. 7 describe the described time run of execution of the components.

As the man skilled in the art will appreciate the method according to the invention can depict any process, in particular any production, control or regulating process, irrespective of the complexity thereof. In that respect the invention is also not limited to the illustrated embodiment by way of example but is defined by the independent claims.

LIST OF REFERENCES 1 computer
1a data processing means
1b memory means
1c input means
2 monitor
3 visualisation monitor
4 structure monitor
5 printer interface
6 printer
7 environment interface
8 symbol of the start component of the category run
9 symbol of the run component of the category run
10 symbol of the end component of the category run
11 symbol of the event component of the category run
12 symbol of the function component of the category function
13 symbol of the start component of the category run
14 symbol of a run component of the category run
15 symbol of a run component of the category run
16 symbol of a function component of the category function
17 symbol of an end run component of the category run
18 symbol of an event component of the category run
19 symbol of an end component of the category run
20 switch object
21 picture object
22 switch object
23 picture object
24 -
31 program lines of an event component
32
33 block instruction
34 selection list
35 plain form of a block instruction
36 selection list
37 keyword
38 selection list
39 keyword
40 keyword
41 selection list
42 selection list
43 program instruction
50 symbol of a start component of the category run
51 symbol of the run component 'preheat'
52 symbol of the run component 'fill'
53 symbol of the run component 'process'
54 symbol of the run component 'empty'
55 symbol of an end component of the category run
56 symbol of the function component 'fill compo1'
57 symbol of the function component 'fill compo2'
58 symbol of the function component 'fill compo3'
59 symbol of the function component 'agitate'
60 symbol of the function component 'heat.

The invention claimed is:

1. A computer-supported method of producing and/or executing program code comprising:

at least one screen for the representation of establishable objects, by way of which information is inputted and outputted when executing the program code, wherein objects on the screen are able to be read and write accessed by means in the program code;

predetermined rules for interconnection of program components, which regulate interconnection of the program components and serial or simultaneous execution, representing in a structure diagram by a category run and a category function; symbols of the program components of the category run are basically arranged horizontally, and symbols of the program components of the category function are basically arranged vertically; the symbols are provided for program component selection wherein said program code comprises program component types of run component, start component, event component, function component, and end component;

wherein the program components of the category run are serially interconnected; and the component type event component of the category run is called up by events, which occur during program run, and the event component in turn can call up run components and function components, that the program component category function includes a component type function component, wherein the function component is called up by a component type of the category run and tasks which are implemented parallel with a calling-up component are carried out by the function component;

wherein associated with the selected program components is a respective symbol, which is represented in the structure diagram wherein the symbol of a program component in the structure diagram represents a virtual container whereby access to the program code of the specific program component occurs by opening the virtual container;

whereby by opening the virtual container, a new screen is created, in which the program code of the corresponding program component can be processed and for each component that is in the structure diagram, a provisional program code comprising an initial line and an end line of the program component, program instructions can now be applied by the user.

2. A method as set forth in claim 1 wherein the program code establishes a condition to one of a plurality of different runs.

3. A method as set forth in claim 1 or claim 2 wherein the symbols are joined together having regard to the predetermined rules by means of lines to represent the serial or parallel execution, whereby the program structure and the program course are represented.

4. A method as set forth in one of claims 1 through 2 wherein upon the addition of a program instruction to the program code portion of a program component the program instruction is provided for selection from one of two program categories.

5. A method as set forth in claim 4 wherein the program instruction is inserted, which includes at least one keyword.

6. A method as set forth in claim 5 wherein upon selection of a keyword in an inserted program instruction a selection list is displayed, which includes syntax error-free program text portions with which the keyword can be replaced.

7. A method as set forth in claim 6 wherein the objects accessed by the user comprises: objects properties, parameter objects and parameter objects properties, parameter objects variables, and parameter objects program components, are automatically taken into the respective selection lists with their individual names.

8. A method as set forth in claim 7 wherein with application of the object which properties of the object are taken into the selection lists is established.

9. A method as set forth in claim 5 wherein replacing keywords in an inserted program instruction is continued until all keywords are replaced by an executable program instruction portion.

10. A computer program product which is stored on a storage medium and which can be loaded into a memory of a computer and which includes software code portions with which a method as set forth in claim 1 is executed when the product runs on the computer.

11. A system with an execution environment for computer-supported production and/or execution of a program code comprising:
   at least one screen for representation of objects which upon execution of the program code provide inputs and outputs of information, wherein produced program code have read and write accesses to the objects of the screen, wherein the system provides program components which can be selected wherein said program components comprise category run and category function for production of the program code;
   predetermined rules for interconnection interconnecting program components which regulate the call-up of the program components and the serial or simultaneous execution thereof;
   the program components of the category run are serially interconnected; the program component category function includes a component type function component;
   the function component can be called up by a component type of the category run and tasks which are executed parallel with the calling-up component are performed by the function component;
   a respective symbol is associated with the types of the program components in a structure diagram wherein the symbols of the serially connected program components of the category run are arranged vertically, and the program components of the category function in parallel are arranged horizontally;
   whereby an additional symbol of a program component in a structural diagram represents a virtual container whereby access to the program code of the corresponding program component occurs by opening the virtual container;
   whereby by opening the virtual container, a new screen is created, in which the program code of the corresponding program component can be processed and for each component that is in the structure diagram, a provisional program code comprising an initial line and an end line of the program component, program instructions can now be applied by the user.

12. A system as set forth in claim 11 wherein in the structure diagram connecting lines between the program components of a run extend vertically, wherein in the case of a program branching into a plurality of runs there is provided a horizontal displacement for an arrangement of the symbols, and that the connecting lines from the calling-up components of the type run to the respective called-up function components extend horizontally, wherein in the case of a call-up of a plurality of functions from a run component there is provided a vertical displacement between the function components.

13. A system as set forth in claim 11 wherein the system provides a development mode and a run time mode, wherein in the run time mode a program code produced in the development mode is executed and the symbols in the structure diagram whose program instructions are just being executed are characterised.

14. A system as set forth in claim 11 wherein a program instruction is associated with a program instruction category selected from query and action and that upon the application of a new program instruction only one program instruction categories can be selected.

15. A system as set forth in one of claims 13 or 14 wherein a selectable program instruction includes at least one keyword which represents a place holder for at least one further keyword or a program instruction portion.

16. A system as set forth in claim 15 wherein a keyword is interlinked with a selection list which is associated with replacement program texts, with which the keyword can be replaced.

17. A system as set forth in claim 16 wherein the contents of individual positions of the respective selection list are such that after replacement of the keyword by one of the positions of the selection list there is a syntax error-free program instruction portion.

18. A system as set forth in claim 11 wherein program instructions selected from allocations, loops and enquiries are contained in the selection lists.

* * * * *